G. PETERSON.
STEAM CONDENSER.
APPLICATION FILED DEC. 16, 1913.

1,139,135.

Patented May 11, 1915.

Witnesses
James Cronin
M. E. Laughlin

Inventor
George Peterson,
By Victor J. Evans
Attorney

THE NORRIS PETERS CO., PHOTO-LITHO., WASHINGTON, D. C.

UNITED STATES PATENT OFFICE.

GEORGE PETERSON, OF BAYONNE, NEW JERSEY.

STEAM-CONDENSER.

1,139,135.  Specification of Letters Patent.  Patented May 11, 1915.

Application filed December 16, 1913. Serial No. 807,115.

*To all whom it may concern:*

Be it known that I, GEORGE PETERSON, a citizen of Sweden, residing at Bayonne, in the county of Hudson and State of New Jersey, have invented new and useful Improvements in Steam-Condensers, of which the following is a specification.

The general objects of this invention are the provision of a simple and efficient device whereby to capture the waste steam emanating from an exhaust pipe and to condense the same; and to utilize the said steam for the purpose of heating water previous to entering a water-boiler, and thereby expedite the heating of water in a usual water-heating plant. And to these ends the invention consists of a series of steam chambers surrounded by a water jacket, and means whereby the water from the said jacket may be introduced into the said steam chambers.

Other objects will appear and be better understood from that embodiment of my invention of which the following is a specification, reference being had to the accompanying drawings forming part hereof, in which:—

Figure 1:
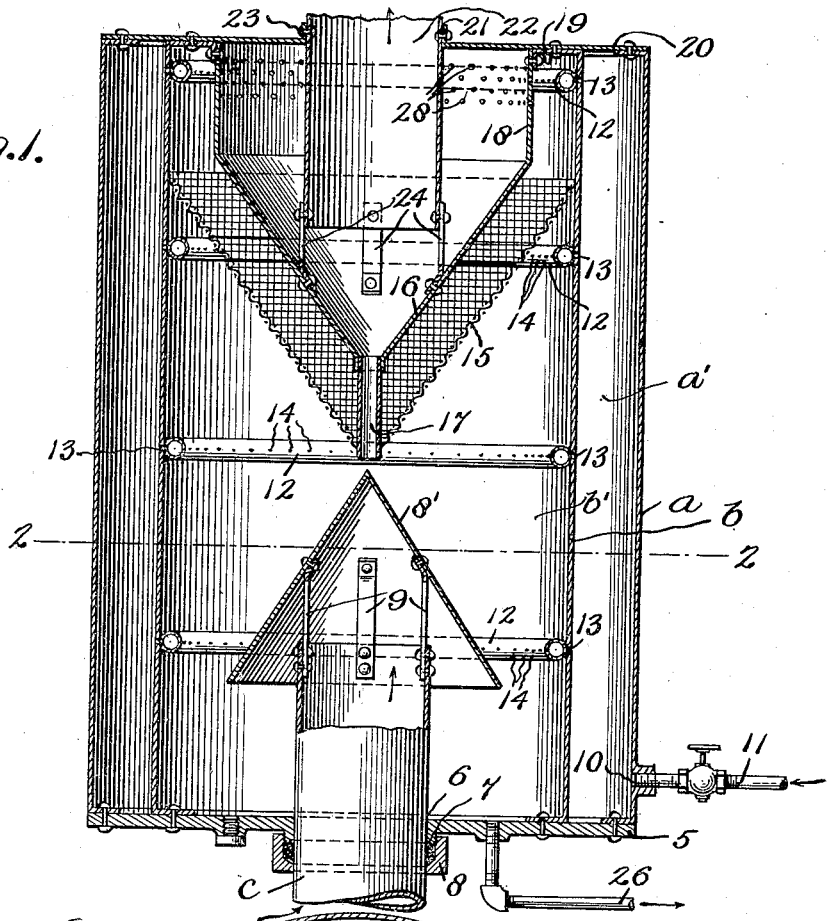
Figure 2:
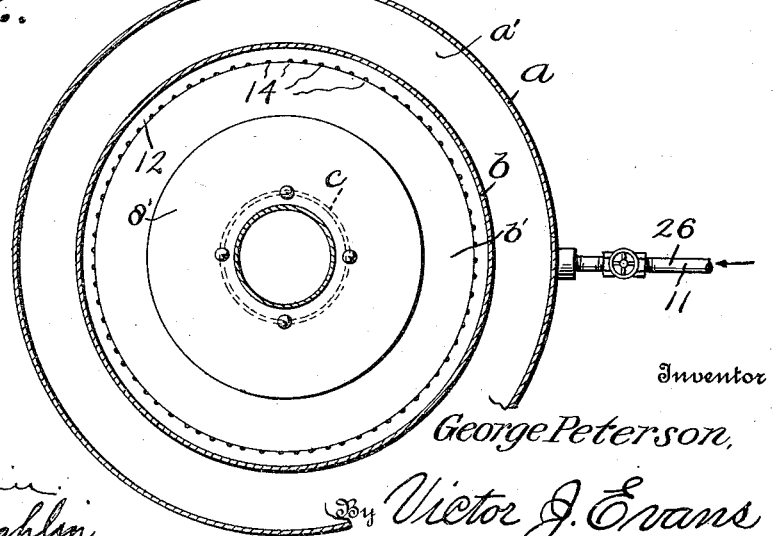

Figure 1 is a vertical cross sectional view of the device. Fig. 2 is a horizontal cross sectional view of the device taken on the line 2—2 in Fig. 1.

The device as shown in the drawings, is formed of a pair of casings $a$ and $b$, which are secured to a common end 5. This end has an opening 6 which is located preferably in the center, and has an extending screw-threaded portion 7, upon which is mounted a stuffing box 8. By means of this opening the device is adapted to be positioned on the exhaust steam pipe $c$, and the stuffing box is provided so as to form a water-tight fitting thereon. The steam pipe $c$ extends within the casing $b$, and is capped with a conical head-piece 8', which is held in spaced relation with the mouth of the pipe by the uprights 9. This cap is provided for the purpose of deflecting the steam downwardly as it escapes from the mouth of the pipe $c$.

The outer casing $a$ is provided with an opening 10 into which is directed a valve controlled pipe 11, which latter operates as a water inlet-pipe for the water jacket $a'$. The inner casing $b$ is provided on the inner surface thereof, with a series of relatively spaced annular pipes 12. These pipes may be secured to the casing $b$ by any suitable manner, such as brazing or the like, and have communication with the water-jacket by means of apertures 13. The pipes are provided with a plurality of perforations 14, which are preferably in alinement with each other, and the water entering the pipes from the water jacket, is directed radially through the perforations in minute jets.

Positioned within the casing $b$ and located appreciably at one end thereof is an inverted conical screen 15, which has its apex adjacent to the apex of the conical head-piece 8'. Positioned within the conical screen and in spaced relation therewith is an inverted conical chamber 16, whose apex is provided with an extending tube 17, which is connected to the apex of the screen. The chamber 16 is provided with a cylinder body portion 18, which is secured by suitable means to a flange 19 formed by bending over the upper edge of the casing $b$. It will be noted here that the outer casing $a$ is also provided with a flange, and that a common end 20 opposite to the end 5 is secured to the casings $a$ and $b$. The end 20 is provided with a centrally located bore 21, in which is positioned the pipe 22. This pipe is secured to the end as at 23, and extends downwardly into the chamber 16. The pipe is connected to the conical portion of the chamber and is held in spaced relation therewith by the legs 24; these legs also augment the securing of the pipe 22 in position within the chamber.

In operation, water enters the water jacket $a'$ from the inlet-pipe 11 and finds its way into the pipes 12, whence it is directed in radial jets into the casing or condensing chamber $b'$. The water obviously drops, by force of gravity, and trickles over the exterior of the chamber 16 and also saturates the screen 15, which breaks up the water into drops. It is to be understood that this operation is effected by that portion of the water which escapes from the uppermost pipe, but the water coming from the pipe adjacent to the screen also is directed against the screen. The water from the lower pipe, augmented by the water from above, flows over the conical head of the pipe $c$ and finally reaches the bottom of the casing $b$ from which it escapes through an outlet pipe 26.

The steam escaping from the exhaust pipe $c$ is deflected downwardly by the cone 8', and the latter being cooled by the water, condenses a portion of the steam. The remaining steam passes out from under the cone and travels upwardly; as it rises, it mixes with the many jets of water coming from the pipes, and while part of the steam is condensed the water is heated by the action of the condensing steam. The remaining steam upon reaching the screen is condensed, the water resulting from the various steps of condensing falling to the bottom of the tank. That steam which is not condensed, by the time it reaches the top, finds its way into the interior of the chamber 16 through the perforations 28 at the upper end thereof, whereupon it is condensed, and the water resulting from this step, runs down the interior of the cone 16 and through the tube 17 whence it flows over the exterior of the conical head and down to the bottom of the chamber.

It will be noted that should any steam remain after undergoing the previous stated operations, this steam will pass through the pipe 22 and escape into the atmosphere.

It is obvious that those skilled in the art may vary the details of construction and arrangements of parts without departing from the spirit of my invention and therefore I do not wish to be limited to such features except as may be required by the claims.

What is claimed as new is:

1. In a condenser for steam, the combination of an outer casing and an inner casing, steam inlet and outlet means positioned in the ends of the casings, a water inlet pipe entering the outer casing, water outlet pipes located in the inner casing and communicating with the outer casing for spraying water within the inner casing, and a series of conical deflectors or baffles located within the inner casing between the steam inlet and steam outlet means, substantially as described.

2. In a condenser for steam, the combination of an inner chamber, an outer chamber, water inlet means entering the outer chamber, water outlet means positioned on the wall of the inner chamber, steam inlet and outlet pipes entering the inner chamber, a conical deflector carried by the steam inlet pipe, a screen located within the inner chamber and arranged in spaced relation with the conical deflector, and a second conical deflector positioned within the inner chamber and arranged in spaced relation to the screen.

In testimony whereof I affix my signature in presence of two witnesses.

GEO. PETERSON.

Witnesses:
 THOS. E. BIRCH,
 CHAS. A. DOLBIER.